United States Patent
Newman

[11] Patent Number: 5,822,397
[45] Date of Patent: Oct. 13, 1998

[54] AUDIO INTERFACE FOR TELECOMMUNICATIONS TEST SYSTEM

[75] Inventor: Craig E. Newman, Wylie, Tex.

[73] Assignee: MCI Communications Corporation, Washington, D.C.

[21] Appl. No.: 717,050

[22] Filed: Sep. 20, 1996

[51] Int. Cl.[6] .............................. H04M 1/24; H04M 1/64
[52] U.S. Cl. .................................. 379/6; 379/27; 379/67
[58] Field of Search ........................... 379/1, 5, 6, 10–15, 379/27, 34, 67, 84, 88, 89, 28, 29, 30, 22, 23, 24, 21

[56] References Cited

U.S. PATENT DOCUMENTS 5,222,120  6/1993  Mcleod et al. ............................ 379/88
5,633,909  5/1997  Fitch ......................................... 379/15

*Primary Examiner*—Paul Loomis

[57] ABSTRACT

A telecommunication services test system which can be used to automatically interact with automated response units and the like. The test system provides a means to automate test cases for services that previously could not be automated due to the requirement of human interaction. A sound generator is coupled with a call generator via an interface device. A controller is coupled with both the call generator and the sound generator devices. The controller controls the call generator and the sound generator through the use of a test case scripts that are designed to test particular telecommunication services that are coupled with a communications network. The controller executes test cases that can direct the sound generator to transmit and/or receive audio signals, including speech signals to and from the call generator in response to audio signals and speech signals originating from the telecommunication service under test. Signals that are received by the speech generator are recorded and stored in computer data files that can be easily transported to remote users thereby allowing remote test case verification.

19 Claims, 5 Drawing Sheets

AUDIO INTERFACE FOR TELECOMMUNICATIONS TEST SYSTEM

BACKGROUND OF THE INVENTION

1. Field of the Invention

The present invention relates generally to telecommunication test systems and more specifically to an automated telecommunications test system that uses synthesized voice signals to test telecommunication services that include voice interaction such as audio response units.

2. Related Art

Testing telecommunication services can be a laborious and time consuming task. This is especially true in today's environment where a wide variety of new telecommunication services are being deployed on a rapid basis. Further, the increased use of automation devices, such as audio response units (ARUs) and the like, complicate the task of testing new telecommunication services. Telecommunication services are typically tested and re-tested at various stages throughout the development process.

For example, as new services are being developed they are typically modified and refined on a frequent basis. The modifications are generally based on several factors including marketing studies, customer feedback, hardware and software design changes, network element changes and the like. To implement such modifications during the development cycle, product development organizations modify the software which drives the various network elements used to support the new service. The modified software versions are then released to testing organizations who are responsible for verifying the functionality and performance of the new service. Accordingly, during a typical product development cycle, many different software versions may be released to the testing organizations as the features and functions of the new service evolve.

Thus, testing organizations typically perform many iterations of various test activities to verify that new services operate as designed and do not adversely affect existing telecommunication services. The dynamic nature of the development of new services, and the time-to-market pressures imposed upon the telecommunications industry, drive the need for timely and efficient test procedures.

Generally these requirements are met by automating test procedures and creating suites of automated test cases. Once test cases are automated they can be repeated with minimal effort. This facilitates regression testing, which verifies common features among different software versions. In addition, automated test cases are generally more reliable than manual test cases due to the reduction of human factor errors. Further, automated test systems are more efficient and reliable because they execute test cases repeatedly in exactly the same manner.

Typical telecommunication services test environments include a plurality of diverse telecommunication components such as transmission lines, call-switch facilities and digital cross-connects (DXCs) that are identical to or equivalent to the network components forming the actual telecommunications network.

Generally, in order to benefit from automation, test cases are designed so that they can be executed without human interaction. This not only reduces test staff requirements, but enables one to run test cases continuously during the day or night. In order for test cases to run unattended, they must be able to verify the correct operation of telecommunication services and they must be able to detect errors when they occur. Typically, test cases are designed to accomplish this by dynamically comparing the test case results against predefined expected results. Alternatively, test cases can be programmed to generate test result logs or the like, which can be analyzed at a later time.

In addition, in order for test cases to run unattended, the telecommunications service under test must not require human interaction. For example, telecommunication services such as voice mail systems, automated collect call services and the like, generally require human interaction. The human interaction is typically in the form of speech and/or telephone keypad inputs. As such, testing these types of telecommunication services are conventionally performed manually.

SUMMARY OF THE INVENTION

Accordingly, the present invention is directed towards a test system used to automate telecommunication services that conventionally could not be automated due to the requirement of human interaction. The automated test system of the present invention can be used to generate speech output and/or capture speech input. The speech capabilities of the present invention are used to interact with telecommunication services under test in an automated fashion.

In particular, the present invention provides a testing system for a telecommunications network that includes a sound generator, an interface device, a call generator and a controller. The sound generator generates audio signals, including speech. The audio signals are transmitted to output terminals of the sound generator. The output terminals of the sound generator are coupled with an interface device. The interface device generates a scaled output signal that is proportional to the input audio signal and is compatible with the call generator.

The scaled output signal, after being routed through the interface device is transmitted to the call generator and/or a loud speaker. The call generator generates test calls on the telecommunications network. Such test calls, also referred to herein as 'test cases' may include speech signals that originate from the sound generator.

Additionally, the sound generator has the capability of recording speech signals that are received from the call generator. Such captured speech signals may be used to verify that particular speech patterns are being sent by an ARU, for example. An ARU is an electronic device that provides synthesized voice messages in response to dual tone multiple frequency (DTMF) signals, (also referred to herein as touch tone keypad signals). In addition, ARUs can also respond to speech patterns. For example, a phone mail system may respond with a particular message when a customer says a particular number or phrase or may respond with a particular message when a customer presses a particular key on a touch tone keypad.

Thus, for example, the controller may cause the sound generator to generate a particular speech signal in response to a recognized speech pattern from an ARU. In addition, the controller may cause the call generator to generate one or more DTMF signals in response to the recognized speech signal captured by the sound generator.

Accordingly, the present invention provides a means for automated test cases to interact, in an unattended fashion, with telecommunication services that use ARU devices and the like. The test system of the present invention may be implemented with the use of a commercial off-the-shelf (COTS) sound card that has digitized speech capabilities. The sound card can be used to interact with ARUs and the like. For example, as part of a particular test case, the sound card may be programmed to record an audio response from an ARU. The recorded response is saved as a computer file, which can be verified at a later date by test engineers, or dynamically verified by the test case during execution.

In addition, the test system of the present invention provides the proper input to the ARU, regardless of whether that input comprises a DTMF signal or a voice signal. If a voice signal is desired, the sound card uses prerecorded digital sound files. The prerecorded digital sound files are translated into audio output by the sound card and transmitted to the ARU under test. For example, suppose one is testing a collect call service in which a user is prompted by the ARU to respond with a 'yes' to accept the charges, or a 'no' to deny the charges. In this case, the test case logic selects the appropriate sound file to be processed by the sound card to produce the desired simulated user response.

BRIEF DESCRIPTION OF THE FIGURES

The present invention will be described with reference to the accompanying figures, wherein.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

The present invention is directed toward a test system that can be used to interact with ARUs, thereby providing automated testing capabilities for services that previously required human interaction. A sound generator is coupled with a call generator via an interface device. A controller is used to control the call generator and the sound generator through test cases that are written by test engineers. The controller executes the test cases which can direct the sound generator to transmit and/or receive audio signals, including speech directed to and from the call generator.

Figure 1:
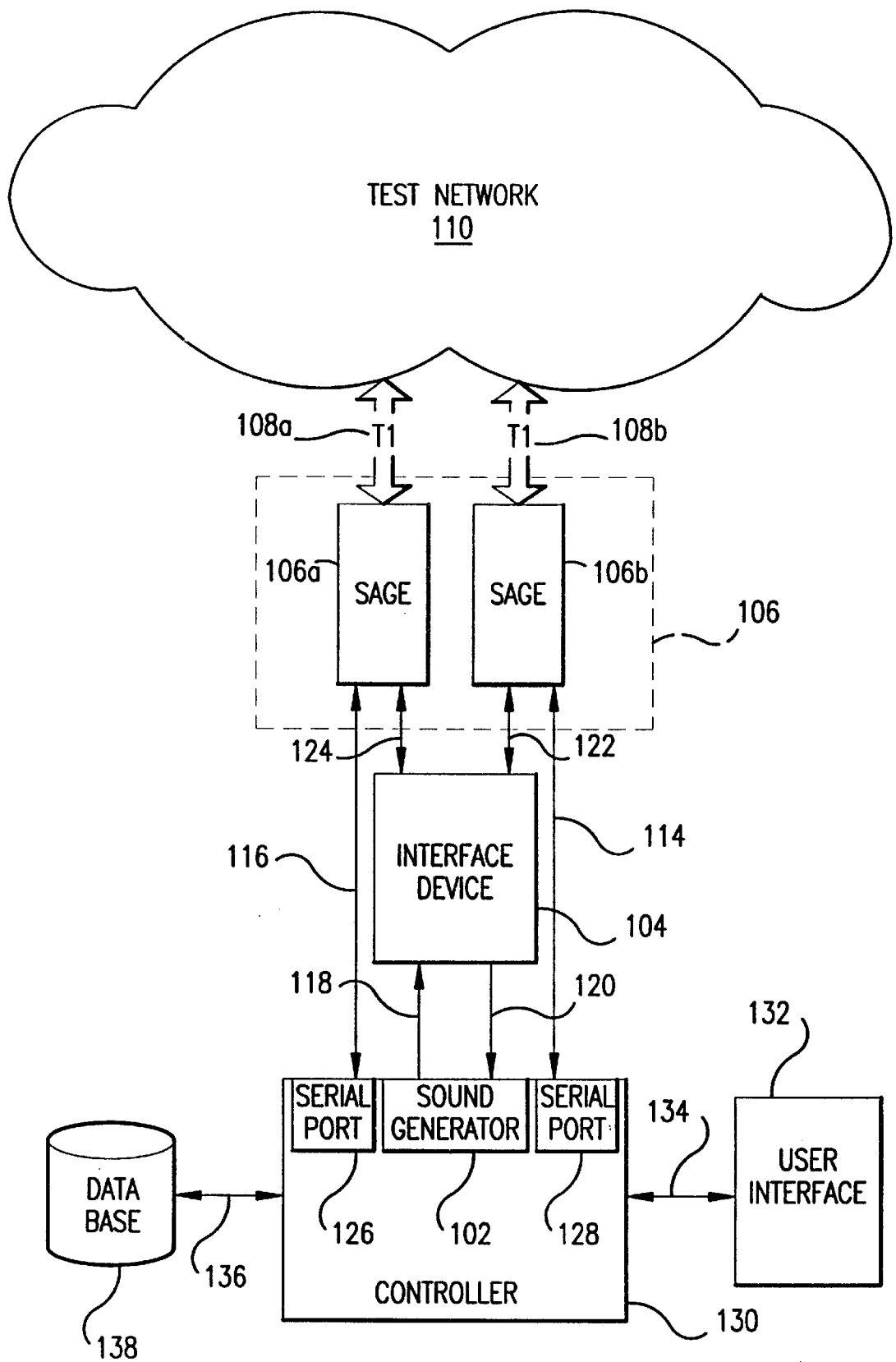
FIG. 1 is a block diagram depicting a preferred embodiment of the present invention in a typical operating environment.

FIG. 1 is a block diagram depicting a preferred embodiment of the present invention in a typical operating environment. The test system depicted in FIG. 1 comprises a controller 130, an interface device 104, a call generator 106, a database 138 and a user interface 132. The call generator 106 is coupled with a test telecommunications network 110. The test network 110 typically comprises a plurality of diverse telecommunication components such as transmission lines, call-switch facilities, digital cross-connects (DXCs) and the like, that are identical to or equivalent to the network components forming an actual telecommunications network. Alternatively, the test system of FIG. 1 may be used to test an actual telecommunications network.

The call generator 106 comprises a pair of T1 testing devices 106a and 106b. In this example, as in a preferred embodiment of the present invention, the pair of T1 test devices used are COTS SAGE Instruments 930A Communication Test Sets, manufactured by SAGE Instruments. Alternatively, any type of call generator can be used without departing from the principles of the present invention. In this example, the SAGE 106a is coupled to the test network 110 via the T1 transmission line 108a. Similarly, the SAGE 106b is coupled with the test network 110 via the T1 transmission line 108b.

The SAGE 106a is connected with the serial line 116 to the serial port 126 of the controller 130. Likewise the SAGE 106b is connected with the serial line 114 to the serial port 128 of the controller 130. The controller 130 controls the actions of the each of the SAGE devices via these serial connections. Typically one of the SAGE devices functions as a call originator and the other SAGE device functions as the call terminator. That is, one of the Sages originates a call that terminates at the other SAGE. Once a test call connection is established communications can occur in both directions simultaneously. In the examples described herein, the SAGE 106a is the call originator and the SAGE 106b is the call terminator.

The interface device 104 acts as an interface and impedance matching device between the sound generator 102 and the call generator 106. The SAGE 106a is coupled with the interface device 104 via the bidirectional transmission line 124. Likewise, the SAGE 106b is coupled with the interface device 104 via the bidirectional transmission line 122. The sound generator 102 is coupled with the interface device 104 via the sound generator's output line 118 and the sound generator's input line 120. Thus, sounds generated by the sound generator can be routed to either the SAGE 106a or the SAGE 106b (or both), via the interface device 104 (described below). Similarly, sound signals can be routed from either the SAGE 106a or the SAGE 106b (or both), to the sound generator 102, via the interface device 104.

The controller 130 includes a pair of serial ports 126 and 128 and a sound generator 102. The controller 130 controls the operation of the sound generator 102 and the call generator 106 according to predefined instructions which are typically stored in the database 138.

The controller 130 may be operated by test personal via a user interface 132, which is coupled with the controller via a bidirectional transmission line 134. Typically, test cases and test case results (or logs), are stored in a database 138, which is coupled with the controller 130, via a bidirectional transmission line 136. Test cases may also be created by using the user interface 132. Additionally, tests can typically be run and/or monitored manually by test personnel via the user interface 132.

A typical test case that can be executed using the present invention will now be described with reference to FIG. 2. The test case process begins with step 202, where control immediately passes to step 204. In step 204 a call is set up by the originating SAGE 106a. Specifically, a command is sent from the controller 130 to the SAGE 106a via the serial connection 116. Such command generally involves directing the SAGE 106a to dial a particular telephone number that is associated with the particular service under test. Alternatively, an out of band device may be used to set up the call using an SS7 IAM (signaling system 7 initial address message), or the like. In any case, the commands and the protocol necessary to control the SAGE 106 and/or other test call devices are specified by the test device manufacturer and are constrained by the configuration of the test network 110. As such, the command and protocol structure will be apparent to those skilled in the relevant art(s).

In this example, the particular service under test is an automated collect call service. The test network is set up such that the collect call service under test responds to the call that is set up during step 204.

Once the test call is set up, a voice connection is established between the SAGE 106a and the collect call service via the T1 transmission line 108a. The collect call service located in a network element (not shown) within the test network 110 responds to the call. The ARU (not shown) answers the call with a particular message such as 'Please enter the telephone number you wish to call'. In step 206, the sound generator records this automated message from the ARU, saves it in a file, and stores the digitized voice file in the database 138.

Next, as step 207 indicates, the ARU voice response recorded from step 206 is compared with an expected voice response. This comparison can take place using various methods. For example, the recorded file created in the previous step can be compared against a pre-existing file, which was recorded earlier. Alternatively, an additional message sent by the ARU can be used to identify a particular response. For example, each possible response that is programmed into a particular ARU can be identified by a unique script number. The script number is sent by the ARU in addition to the actual voice response and is compared against the expected script number is step 207.

In step 208 the process determines whether the response from the ARU matches the expected response. In this case, the message, 'Please enter the telephone number you wish to call' is verified for the correct content. If the response from the ARU does not match the expected response an error condition is logged in step 209 and the process ends with step 210. If the responses match, control passes to step 211.

In step 211, DTMF signals that represent the telephone number of the collect call is sent by the SAGE 106a to the ARU. This is typically accomplished by the SAGE 106a via a command from the controller 130. In this example, the number that is entered in step 211 represents the telephone number of the terminating call device, in this case, the SAGE 106b.

The ARU responds with another voice message. In this example, the voice message is 'Please say your name after the tone'. In step 212, the sound generator records this automated message from the ARU, saves it in a file, and stores the digitized voice file in the database 138.

Next, as step 213 indicates, the ARU voice response is compared against an expected response and control passes to step 214. In step 214 the process determines whether the response from the ARU matches the expected response. In this case, the message, 'Please say your name after the tone' is verified for the correct content. If the response from the ARU does not match the expected response an error condition is logged in step 215 and the process ends with step 216. If the responses match, control passes to step 217.

In step 217, the sound generator 102 transmits a voice signal to the ARU. This is typically accomplished by using a pre-recorded voice file that is stored in the data base 138. Upon a command from the controller 130 the pre-recorded voice file is processed by the sound generator 102. The sound generator 102 generates a voice signal that is transmitted to the test network 110. In this case, 'Bob' is transmitted to the ARU via the sound generator's output line 118, the interface device 104, the SAGE 106a the and T1 line 108a.

In step 218 the process waits for the ARU to call the terminating SAGE 106b. Next, in step 220 the call is answered by the terminating SAGE 106b. In this case, the sound generator is directed to transmit 'hello' upon answering the incoming call from the ARU. This is accomplished in the same manner as was described for step 217 above.

Next, the ARU provides another voice response. In this example, the voice response is 'Hello, this is an automated operator. You have a collect call from Bob in Colorado Springs, Colo. If you wish to accept this call please say YES. If you do not wish to accept this call please say NO.' In step 222, the sound generator records this automated message from the ARU, saves it in a file, and stores the digitized voice file in the database 138.

Next, as step 224 indicates, the ARU voice response is compared with an expected voice response and control passes to step 226. In step 226 the process determines whether the response from the ARU matches the expected response. If the response from the ARU does not match the expected response an error condition is logged in step 228 and the process ends with step 230. If the responses match control passes to step 232.

In step 232 the sound generator is directed to transmit 'YES' to the ARU. This response should cause the ARU to complete the call. Thus, in step 234 the process waits for the connection and verifies the connection. This is typically accomplished by generating a tone at one end of the connection and verifying that such tone is received at the other end of the connection.

Next in step 236, the process determines whether the connection from step 234 has been successfully completed. If so, such results are reported in a log which is stored in the data base 138. If not, an error is reported. In either case, the process ends with step 244.

Figure 5:
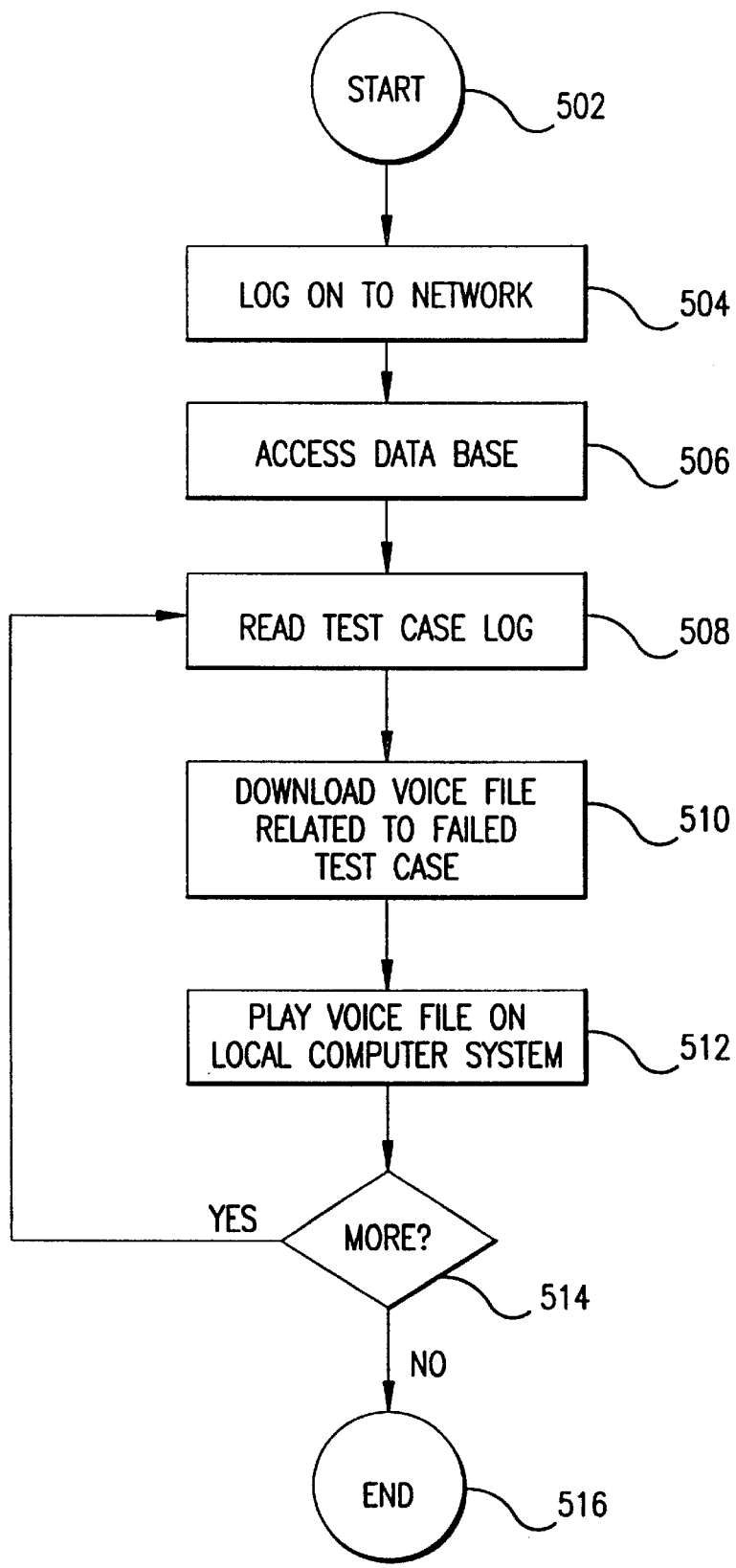
FIG. 5 is a flow chart depicting an aspect of the present invention that allows test personnel to monitor test results from remote locations.

FIG. 5 is a flowchart that depicts an aspect of the present invention that allows test engineers to monitor test results from remote locations. In particular, this aspect of the present invention makes use of the recording features of the present invention as depicted by steps 206, 212, and 222 above.

Accordingly the flowchart in FIG. 5 depicts a process to monitor audio test case results from a remote location. The process begins with step 502 where control immediately passes to step 504. In step 504 the test engineer logs on to the computer network. This can be any type of computer network such as a local area network, a wide area network or the like.

Next in step 506, the test engineer accesses the data base that contains the test case logs and the recorded voice files as previously described with reference to FIG. 2. Next, in step 508 the test engineer reads the test case log that is of interest.

Figure 2:
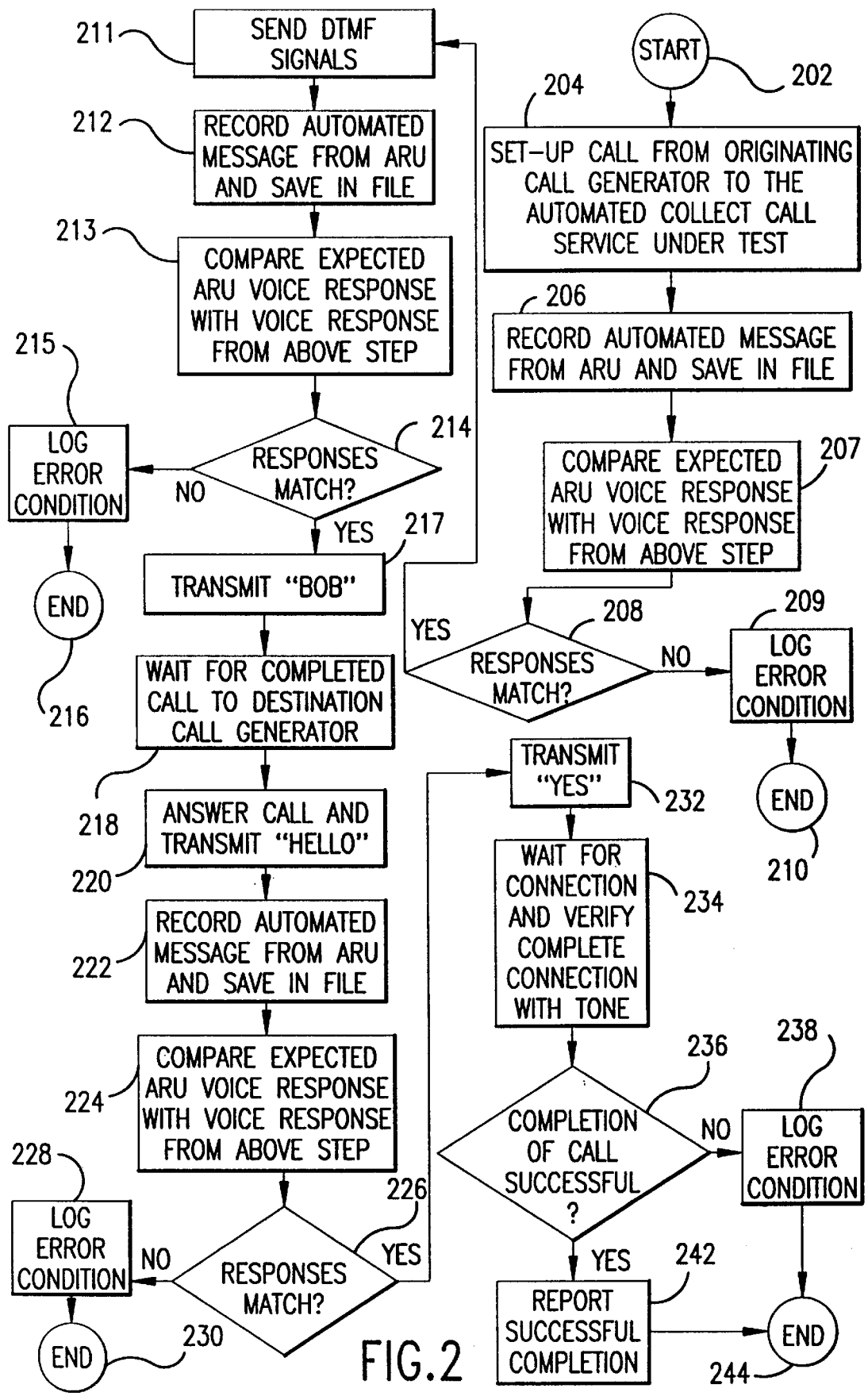
FIG. 2 is a flow chart depicting a typical test case that can be used with an embodiment of the present invention.

Suppose for example, that a test case which follows the process depicted by the flowchart in FIG. 2 is executed. Further suppose that the test case fails due to an invalid response recorded by step 206. In this case, as can be seen, the comparison in step 207 and the decision in step 208 will cause the test case to record the error in step 209 and terminate in step 210.

Accordingly, using this example, the test case engineer in step 508 reads the log that was generated by the test case in step 209. The test case log conveys the fact that the test case failed due to an invalid response recorded in step 206. This may be all the information available to the test engineer. Using conventional methods, in order to determine the exact cause of the failure, the test engineer typically must re-run the test case and monitor it while it is being re-run.

However by using the recording capabilities of the present invention the test engineer simply downloads the failed recorded voice file and plays it on the local computer system. Thus, as depicted by step 510 the failed recorded voice file is downloaded to the local computer system. Next, in step 512, the downloaded voice file from step 510 is played on a sound device located on the local computer system. Alternatively, a test case can be executed from a remote location. In this case, the voice response from the test case is transmitted and played back on the local computer system in a near real-time fashion.

Thus, as can be seen, a test engineer can use the present invention to listen to a response from a particular test case from a remote location with a local computer system that is equipped with a sound device. As stated, in the preferred embodiment, the sound generator 102 is a COTS sound card. Thus, such devices are readily available and easily obtained. This feature of the present invention, as depicted by FIG. 5, alleviates the need to travel to the test lab in order to re-run and monitor failed test cases. Moreover, in some cases the error which caused the initial failure may not be easily reproduced. Thus, the present invention may be used to detect intermittent errors that are not be easily detected using conventional methods.

Finally in step 514, if more logs are to be viewed, control passes to step 508 and the process, as previously described, is repeated. If no additional test case logs are to be viewed, the process ends in step 516.

Figure 3:
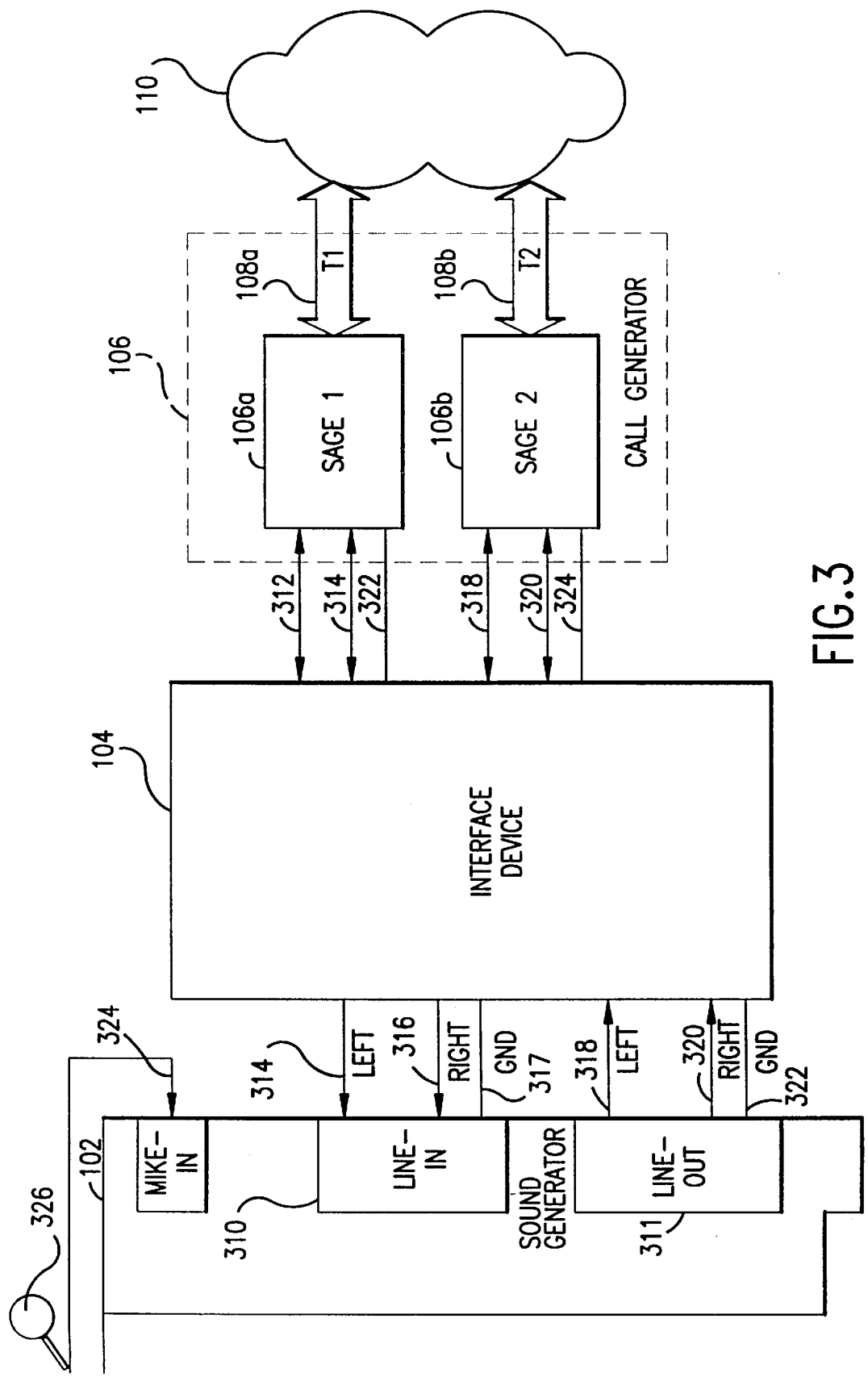
FIG. 3 depicts, a signal generator 102, an interface device 104, a call generator 106 and a test network 110, according to a preferred embodiment of the present invention.

FIG. 3 depicts, a signal generator 102, an interface device 104, a call generator 106 and a test network 110, according to a preferred embodiment of the present invention. Accordingly, the signal generator 102 comprises a line-in interface 310 and a line-out interface 311. The line-in interface 310 of the signal generator 102 is coupled with the interface device 104 via the left and right input lines 314 and 316 respectively, and a common ground line 317. Similarly, the line-out interface 311 of the signal generator 102 is coupled with the interface device 104, via the left and right output lines 318 and 320 respectively, and a common ground line 322. A microphone 326 is coupled with the sound generator 102 via a microphone input line 324.

In this example, the call generator 106 comprises a set of SAGE Instruments Communication test devices, 106a and 106b (generally 106). The SAGE 106a functions as a call originator and the SAGE 106b functions as a call terminator. Each SAGE test device 106 is coupled with the test network 110 via a T1 communication line 108a and 108b (generally 108). Each SAGE test device 106 is coupled with the interface device 104 via two communication lines and a common ground line. For example, the SAGE 106a is coupled with the interface device 104 via the two bidirectional communication lines 312 and 314, and the ground line 322. Likewise, the SAGE 106b is coupled with the interface device 104 via the two bidirectional communication lines 318 and 320, and the ground line 322. Note, that the bidirectional communication lines may be referred to as the 'tip' 312 and 318 and 'ring' 318 and 320 lines.

The details of the interface device 104 will now be described with reference to FIG. 4. The interface device 104 is used for impedance matching between the sound generator 102 and the call generator 106. The interface device comprises a routing section 444, interface circuitry for the sound generator 102 (depicted to the left of the routing section 444) and interface circuitry for the call generator 106 (depicted to the right of the routing section 444). In addition, a loudspeaker 426 is coupled with the routing section 444.

Signals that are to be transmitted to the SAGE 106a device are routed to the signal line '1XMIT' 436. Signals are received from the SAGE 106a device via the signal line '1RCV' 430. Likewise signals that are to be transmitted to the SAGE 106b device are routed to the signal line '2XMIT' 434 and signals are received from the SAGE 106b device via the signal line '2RCV' 432. Signals are output from the sound generator 102 via the output left 424 and output right 428 signal lines. Similarly, signals are received by the sound generator 102 via the input left 440 and input right 442 signal lines.

On the right side of the interface device 104 is the interface to the call generator 106. The interface to the call generator 106 is accomplished via a pair of hybrids 428 and a pair of two wire interfaces 430. The two wire circuit going into the two wire interface 430, is converted into a four wire circuit coupled with the hybrid 428. The reverse is also true, that is, the four wire circuit coupled with the hybrid 428 is converted into a two wire circuit coupled with the two wire interface 430. The use of hybrids to convert two wire into four wire communication circuits (and vice versa) are well-known in the art.

The routing section 444 comprises 5 operational amplifiers 404. Each op amp 404 is arranged in a similar well-known manner. The function of the op amps will now be described with reference to the op amp 404 in the upper left corner of the routing section 444. It should be appreciated that each op amp 404 functions in a similar manner. The op amp 404 comprises 4 inputs 411 that are all tied to the negative op amp input 417 of the op amp 404. The positive op amp input 415 is tied to ground. The op amp 404 has one output 409. A resister 407 is connected between the negative op amp input 417 and the op amp output 409. Likewise a resister 405 is connected between each of the inputs 411 and the negative op amp input 404. As is well known in the art, the op amp 404 configured in this manner functions to amplify the signals that are applied to the negative op amp input 417. The amplified signal appears on the op amp output 409. Further, all of the inputs 411 are added together. The amplified signal that appears on the op amp output line 409 is proportional to the sum of all of the input signals 417. The amount of amplification that occurs depends upon the values chosen for the resisters 407 and 405.

In addition the interface device 104 comprises a plurality of variable amplifiers 402. The variable amplifiers 402 provide a means for adjusting the impedance of the input and output signals to and from the interface device so that it conforms with the impedance requirements of the sound generator 102 and the call generator 106. For example, taking the variable amplifier 402 located in the upper left corner as an example, the impedance of the input signal 409 may be adjusted by changing the value of the variable resistor 441.

The interface device may be configured in a number of different ways by changing the position of the jumpers which are coupled with each of the inputs 411 to each of the operational amplifiers 404. For example, again using the upper left op amp 404 as an example, the jumper 406 is in the open position and the jumper 408 in the closed position. Different routings can be achieved by opening and closing the jumper positions. For example, the outputs from the sound generator 424 and 428 can be routed to either or both of the inputs 436 and 434 of the SAGE devices 106. Likewise the outputs 430 and 432 from the sages 106 can be routed to either or both of the inputs 440 and 442 of the sound generator 102. Similarly, any or all of the inputs and outputs from the sound generator 102 and/or the call generator 106 can be routed to the loudspeaker 426 so that sound communications can be monitored.

Figure 4:
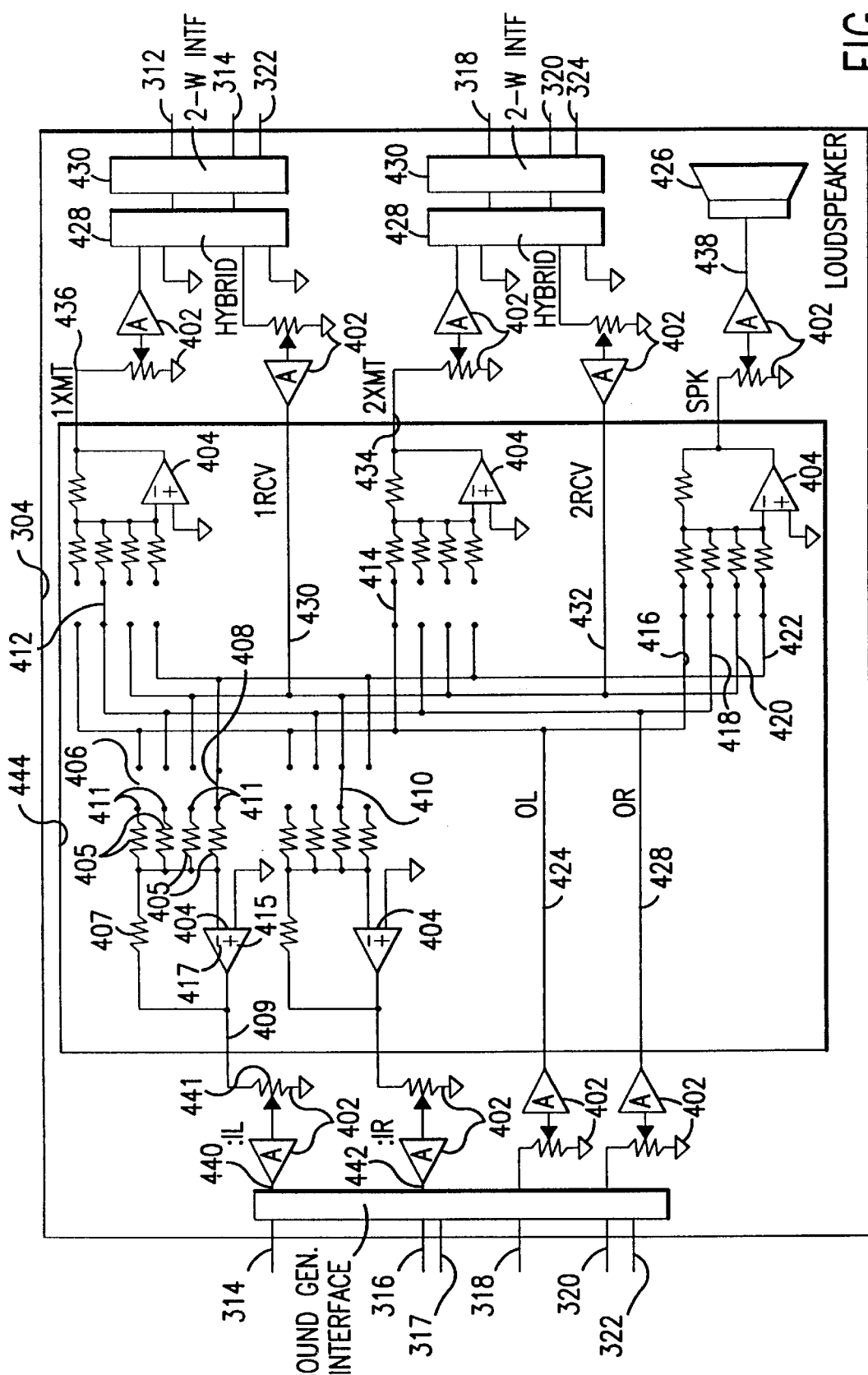
FIG. 4 shows the details of an implementation of an interface device according to a preferred embodiment of the present invention.

In order to describe the function of the interface device 104, the signals that are routed through the interface device will now be described with reference to the configuration of the jumpers as depicted in FIG. 4. Two output lines from the sound generator 102 are shown on the lower left side of FIG. 4, namely the output left signal line 424, and the output right signal line 428. The audio signals on these lines are routed to the SAGE device 106a and the SAGE device 106b. More specifically the output signals are routed to the transmit portion of each SAGE device 106. For example, as can be seen, the output left signal line 424 is connected to the input '2XMIT' 434 of the SAGE 106b via the closed jumper 414. Thus, sound signals originating from output left channel 424 are transmitted by the SAGE 106b. Likewise, the output right signal line 428 is connected to the input '1XMIT' 436 of the SAGE 106a via the closed jumper 412. Thus, sound signals originating from the output right channel 428 are transmitted by the SAGE 106a.

Similarly, the signals received from the SAGE devices 106 are routed to the inputs 440 and 442 to the sound generator 102. For example signals received from the output line 430 of the SAGE 106a are routed to the input right line 442 of the sound generator 102 via closed jumper 410. Likewise, the signals received from the output line 432 of the SAGE 106b are routed to the input left line 440 of the sound generator 102 via closed jumper 408.

In this configuration shown in FIG. 4, the output signals originating from both SAGE devices 106 and the output signals originating from the sound generator device 102 are routed to the loud speaker 426. In this fashion all audio signals that originate from the sound generator 102 and from either of the SAGE devices are heard on the loud speaker 426. For example as can be seen by the closed jumper 416, the output left signal 424 from the sound generator 102 is coupled with the loud speaker input 438. Likewise, as can be seen by the closed jumper 418, the output right signal 428 is coupled with the input to the loud speaker 428. Further, as can be seen by the jumper 420 the received signal 432 from the SAGE 106b is coupled with the input to the loud speaker 438. Finally as can be seen by the closed jumper 422 the output signal 432 from the SAGE 106b is coupled with the input to the loud speaker 438.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for testing telecommunication services coupled with a communications network, comprising:
   a sound generator capable of generating pre-selected speech signals;
   a call generator, coupled with the communications network, capable of generating and receiving telephone calls used to test the telecommunication services;
   an interface device, coupled between said sound generator and said call generator for interfacing and routing audio signals between said sound generator and said call generator and capable of scaling said audio signals from said sound generator to be compatible with said call generator; and
   a controller, coupled with said sound generator and said call generator, for controlling the operation of said sound and said call generator according to predefined instructions.

2. The system of claim 1, wherein said sound generator further comprises a recording means for recording and storing audio signals.

3. The system of claim 1, wherein said interface device further comprises an impedance matching means between said sound generator and said call generator.

4. The system of claim 1, wherein said controller recognizes selected speech signals from the telecommunication services and responds to said selected sound signals by directing said speech generator to generate DTMF signals.

5. The system of claim 1, wherein said controller recognizes selected speech signals from the telecommunication services and responds to said selected speech signals by directing said call generator to generate DTMF signals.

6. The system of claim 1, wherein said controller recognizes selected speech signals from the telecommunication services and responds to said selected speech signals by directing said speech generator to generate a speech signal.

7. The system of claim 1, wherein said interface device further includes:
   a first amplifier having a first input and output, said first input being coupled to a first input terminal of said interface device and said first output being coupled to a first output terminal of said interface device;
   a second amplifier having a second input and output, said second input being coupled to a second input terminal of said interface device and said second output being coupled to a second output terminal of said interface device;
   a third amplifier having a third input and output, said third input being coupled to a third input terminal of said interface device and said third output being coupled to a third output terminal of said interface device; and
   a fourth amplifier having a forth input and output, said forth input being coupled to a fourth input terminal of said interface device and said forth output being coupled to said fourth output terminal of said interface device.

8. The system of claim 7, wherein said interface device further includes:
   a speaker coupled to at least one of said first, second, third and fourth input terminals of said interface device.

9. The system of claim 1, wherein said sound generator comprises a sound card.

10. The system of claim 1, wherein said call generator comprises a telecommunication inband testing device.

11. A method for testing audio response units for an automated test case, comprising the steps of:
   (1) setting up a test call;
   (2) receiving an audio message from the audio response unit;
   (3) comparing the audio message from step (2) against an expected message;
   (4) determining whether the expected message matches the audio message received in step (2);
   (5) if the expected messages matches the audio message received in step (2), responding to the audio response message with either a DTMF signal or a pre-recorded digitized speech signal, as appropriate, and thereafter repeating at least steps (2)–(4) until the end of the test case wherein said pre-recorded digitized speech is scaled to be compatible with a call generator that setup said test call; and
   (6) if the expected message does not match the message received in the step (2), log the results and end the test case.

12. An apparatus for testing telecommunication services coupled with a communications network, comprising:

a sound generator means for generating pre-selected speech signals;

a call generator means coupled with the communications network, for generating and receiving telephone calls used to test the telecommunication services;

an interface device means coupled between said sound generator and said call generator for interfacing and routing audio signals between said sound generator and said call generator and capable of scaling said audio signals from said sound generator to be compatible with said call generator; and a controller means coupled with said sound generator and said call generator for controlling the operation of said sound and said call generator according to predefined instructions.

13. The apparatus of claim 12, wherein said sound generator means further comprises a recording means for recording and storing audio signals.

14. The apparatus of claim 12, wherein said interface means includes comprises an impedance matching means between said sound generator and said call generator.

15. The apparatus of claim 12, wherein said controller means recognizes selected speech signals from the telecommunication services and responds to said selected speech signals by directing said speech generator means to generate a DTMF signal.

16. The apparatus of claim 12, wherein said controller means recognizes selected speech signals from the telecommunication services and responds to said selected speech signals by directing said speech generator means to generate a speech signal.

17. The apparatus of claim 12, wherein the interface means includes:

a first amplifier having a first input and output, said first input being coupled to a first input terminal of said interface device and said first output being coupled to a first output terminal of said interface device;

a second amplifier having a second input and output, said second input being coupled to a second input terminal of said interface device and said second output being coupled to a second output terminal of said interface device;

a third amplifier having a third input and output, said third input being coupled to a third input terminal of said interface device and said third output being coupled to a third output terminal of said interface device; and a fourth amplifier having a forth input and output, said forth input being coupled to a fourth input terminal of said interface device and said forth output being coupled to said fourth output terminal of said interface device.

18. The apparatus of claim 17, wherein said interface means further includes:

a speaker coupled to at least one of the first, second, third and fourth input terminals of said interface device.

19. The apparatus of claim 12, wherein said sound generator means comprises a sound card.

* * * * *